Figure 1:
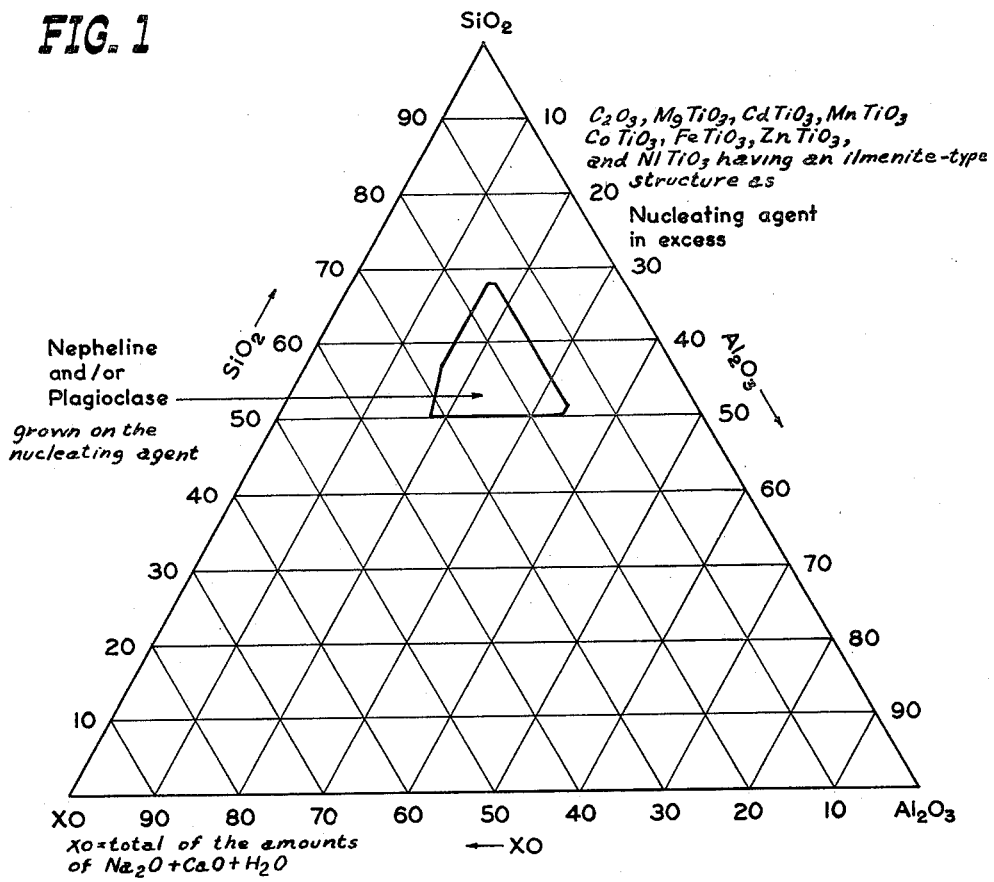

3,146,114
METHOD OF MAKING SEMICRYSTALLINE CERAMIC BODIES AND THE COMPOSITION THEREOF
Herbert D. Kivlighn, Elmira, N.Y., assignor to Corning Glass Works, Corning, N.Y., a corporation of New York
Filed Nov. 23, 1959, Ser. No. 852,159
9 Claims. (Cl. 106—39)

This invention relates to the manufacture of semicrystalline ceramic bodies by the controlled crystallization by heat-treatment of glass bodies, and has for its primary object an improved method for the controlled crystallization of glass bodies comprising primarily the ternary system $Na_2O \cdot Al_2O_3 \cdot SiO_2$.

Another object is to provide new semicrystalline bodies resulting from such improved method. As used herein the term semicrystalline body means a body which was melted and cooled as a glass and thereafter treated by heat at controlled temperatures to convert it to the state of finely divided crystals dispersed substantially uniformly throughout a glassy matrix, the crystals comprising a major proportion of the mass of the body, and the body exhibiting physical properties such as coefficient of expansion, density, strength, etc., differing substantially from such properties of a "glass" of the same composition.

The useful crystallization of glass is now commonly controlled by introducing into the glass a nucleating agent or crystallization-promoting agent and then heat treating the glass in a specific temperature range for a specific time. The usual nucleating agent is $TiO_2$ which is generally effective for the majority of systems of compositions containing crystallizable components. I have found, however, that $TiO_2$ per se is not effective for nucleating crystallizable components of the glasses of the above-mentioned ternary system, in which the crystallizable component is nepheline ($Na_2O \cdot Al_2O_3 \cdot 2SiO_2$) or in such ternary system which also contains a minor but significant amount of CaO in which the crystallizable component is a plagioclase (a solid solution of albite

and anorthite, $CaO \cdot Al_2O_3 \cdot 2SiO_2$). Since such compositions form glasses which are particularly advantageous because of such characteristics as being easily workable and inexpensive, and, furthermore, the resulting semicrystalline bodies have properties superior to the glasses themselves, such as deformation temperature and strength, a method for the controlled crystallization of the glasses of such compositions is much to be desired.

I have now discovered that a semicrystalline body containing a major proportion of crystals of nepheline and/or plagioclase can be produced by heating certain glasses of such composition, as hereinafter more fully described, by incorporating in said glass composition as apparent nucleating agents the constituents of at least one compound which normally exists in the hexagonally, close-packed ilmenite structure selected from the group consisting of iron titanate, zinc titanate, magnesium titanate, cadmium titanate, manganese titanate, cobalt titanate, nickel titanate, and chromium (III) oxide. Moreover, in addition to the $Na_2O$, CaO, $Al_2O_3$, and $SiO_2$ as described above, small amounts of other inorganic materials such as $B_2O_3$, $P_2O_5$, $K_2O$, PbO, BaO, and the like may be included in the base glass composition without objectionably affecting the process or product thereof. The presence of substantial $Li_2O$ in the compositions, however, is undesirable because of its tendency to cause precipitation of crystalline phases other than the desired nepheline or plagioclase.

I have found that the range of compositions which can be utilized for the new method and the product thereof consists essentially on a mole percent basis of 50–68% $SiO_2$, 16–34% $Al_2O_3$, 7–34% $Na_2O$, 0–15% CaO, 0–6% $K_2O$, the total $Na_2O$, CaO and $K_2O$ being at least 15% but not over 34% and the mole ratio of

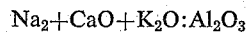

not exceeding 1.7. While the useful compositions of the base glass preferably consists solely of $SiO_2$, $Al_2O_3$, $Na_2O$ and, if desired CaO and/or $K_2O$ in the stated proportions, the inclusion in such base glass of amounts up to about 10 mole percent of minor constituents such as unavoidable impurities and other components, which do not materially affect the fundamental characteristics of the glass or of the semicrystalline product, is not contrary to the intent and scope of the invention.

The new method comprises introducing into such glass compositions as apparent nucleating agents compounds forming crystals with ilmenite-type structures in the indicated proportion based upon a mole percent excess over the base glass composition, selected from the group consisting of 0.08–0.50% $Cr_2O_3$, and at least one titanate of a divalent metal oxide selected from the group consisting of iron oxide, cobalt oxide, cadmium oxide, zinc oxide, nickel oxide, manganese oxide, and magnesium oxide in which the amount of the $TiO_2$ constituent is between 2.9% and 12% and the proportion of the divalent metal oxide constituent being between 1.9% and 10%, the total of the titanates being at least 6%, and thereafter heat-treating the glass body, formed to the desired shape from the molten glass, by exposing the glass body to a temperature between 800° C. and 1150° C. for a sufficient time to cause the major proportion of the glass to crystallize.

The nucleating agents may be incorporated in the desired glass composition by adding the compound per se to the batch, such as iron titanate, or by adding the chemical constituents of the compound individually to the batch, such as magnesia and titania, or even by adding a compound which will decompose at the temperature utilized for melting the glass to produce the desired nucleating agent, such as ammonium dichromate. The mole ratio of the effective divalent metal oxide to titania will, of course, be 1:1 when the constituents of the nucleating agent are added to the batch solely as the corresponding titanates, but such mole ratio can vary considerably, both above and below the 1:1 proportion, when the chemical constituents of effective titanates are added individually or in addition to the divalent metal titanate in the glass batch. While there does not appear to be any undesirable effect upon the properties of the glass or the resulting semicrystalline product because of such variation in the mole ratio of $RO:TiO_2$, the absolute amounts of the nucleating agents and the constituents thereof must be maintained within the amounts set forth above to produce a useful product. Thus, too little $Cr_2O_3$, $RO \cdot TiO_2$, or RO and $TiO_2$ individually, result in insufficient nucleation and produce a body which is weak and only slightly crystalline. On the other hand, too much $Cr_2O_3$, $RO \cdot TiO_2$, or $TiO_2$ in the glass composition results in melts which crystallize upon cooling from the molten state and hence are not suitable to be formed as glass bodies for subsequent conversion to the semi-crystalline product. Furthermore, too much of the RO component of the nucleating agent, over and above the above-described maximum amount, undesirably dilutes the amount of crystallizable constituents and results in coarse-grained products, with weak strength and surface cracks which are associated therewith.

Although substantial crystallization and conversion of the glass body to a useful semicrystalline body will occur if the temperature of the body is raised at a substantially uniform rate from room temperature through about 800° C. and on up to about 1150° C., or if the body is held for a sufficiently long time, up to about 10 hours, at any temperature within the 800° C.–1150° C. range, a more complete and more desirable crystallization will occur if the body is soaked or held at about 800° C.–850° C. for about 1–4 hours and then at about 1000° C.–1080° C. for about 6–12 hours. After such treatment a further increase in temperature is superfluous.

The stated soaking temperatures are determined from an inspection of the trace or curve representing the differential thermal analysis of the glass, which is a well known method of determining the temperatures of the various exothermal and endothermal reactions occurring in a glass while it is being heated. The named soaking temperatures were thus selected as indicating significant molecular rearrangements of the present compositions. Another intermediate soaking temperature is also indicated at about 900° C.–950° C. for which a holding time of about 3–8 hours has been found suitable.

In order to insure against shattering of the body from severe thermal gradients or deformation of the body by bringing it to too high a temperature before sufficient crystallization has occurred to support it in its original form, it has been found desirable to limit the rate of temperature increase during heat treatment, and also during heating to the heat-treating temperature range, to about 5° C. per minute, though much higher rates can be tolerated if the bodies being treated are of thin and substantially uniform cross-section so that substantial thermal gradients will not occur and if deformation is of no consideration or the body is supported against deformation by auxiliary support means.

For convenience in describing said titanates, they may be considered as a combination of $TiO_2$ with the respective divalent metal oxides: namely, MgO, CdO, MnO, CoO, ZnO, FeO, and NiO. Thus, considered on this basis, the effective amount of the divalent metal titanates can be properly described with relation to the mole percent in excess of the base glass composition for each of the constituents of the titanate as set forth above. While it is believed that the effective nucleating action of the defined nucleating agents is due to the precipitation of minute crystals or nuclei of $Cr_2O_3$ or the divalent metal titanates from the glass in a crystal arrangement which can be defined as a close-packed hexagonal arrangement of the ilmenite type, the reason for the large variation in the permissible ratio of divalent metal oxide to titania cannot be explained on the grounds of crystal structure as only the metatitanates, that is, those having a mole ratio of divalent metal oxide to titania of 1:1, possess the ilmenite-type structure. However, it is believed that at the temperature at which the glass is melted the constituents of the titanates are dispersed in the glass network and only become associated in the correct relationship to serve as nuclei for further crystallization of the crystallizable components of the glass during cooling of the molten glass or upon subsequent heat-treatment as described above. According to this theory, the law of mass action would dictate that an excess amount of either of the constituents over and above equal mole amounts would cause the equilibrium condition of the following reaction to be shifted to the right:

$$RO + TiO_2 = RTiO_3 (RO \cdot TiO_2)$$

wherein RO is an effective divalent metal oxide as defined above.

This description of the apparent mechanism of the nucleating action of crystals possessing the ilmenite-type structure, is supported by the finding that neither the individual divalent metal oxides nor the $TiO_2$ are effective per se in promoting any useful crystallization of said glasses.

Compositions within the stated ranges which may be utilized in carrying out the invention are illustrated in Table I in which the constituents of the base glass are set forth in mole percent and the amount of apparent nucleating agents are set forth either individually or as the sum of their constituents on a mole percent basis in excess of the base glass composition.

*Table I*

| | 1 | 2 | 3 | 4 | 5 | 6 | 7 | 8 | 9 |
|---|---|---|---|---|---|---|---|---|---|
| $SiO_2$ | 61.7 | 51.8 | 54.1 | 51.8 | 58.7 | 63.1 | 57.4 | 51.8 | 59.7 |
| $Na_2O$ | 21.8 | 27.9 | 17.5 | 23.9 | 17.1 | 16.6 | 21.3 | 23.9 | 20.0 |
| $Al_2O_3$ | 16.5 | 20.3 | 28.4 | 24.3 | 24.2 | 20.3 | 21.3 | 24.3 | 20.3 |
| CdO | 3.9 | 4.0 | 4.2 | | | | | | |
| CoO | | | | 2.3 | 2.3 | 2.3 | 6.0 | | |
| $TiO_2$ | 8.4 | 8.6 | 9.0 | 7.9 | 7.9 | 7.8 | 7.8 | | |
| $Cr_2O_3$ | | | | | | | | 0.11 | 0.11 |

| | 10 | 11 | 12 | 13 | 14 | 15 | 16 | 17 | 18 |
|---|---|---|---|---|---|---|---|---|---|
| $SiO_2$ | 65.5 | 57.4 | 57.4 | 57.4 | 57.4 | 51.8 | 58.7 | 64.5 | 57.4 |
| $Na_2O$ | 17.5 | 21.3 | 21.3 | 21.3 | 21.3 | 23.9 | 17.1 | 17.5 | 21.3 |
| $Al_2O_3$ | 18.0 | 21.3 | 21.3 | 21.3 | 21.3 | 24.3 | 25.2 | 18.0 | 21.3 |
| FeO | | | | | | 3.0 | 3.0 | 2.8 | 1.9 |
| $TiO_2$ | | | | | | 4.9 | 4.9 | 4.7 | 4.8 |
| $Cr_2O_3$ | 0.11 | 0.09 | 0.18 | 0.13 | 0.46 | | | | |

| | 19 | 20 | 21 | 22 | 23 | 24 | 25 | 26 | 27 |
|---|---|---|---|---|---|---|---|---|---|
| $SiO_2$ | 57.4 | 57.4 | 57.4 | 51.8 | 58.7 | 64.5 | 58.7 | 57.4 | 57.4 |
| $Na_2O$ | 21.3 | 21.3 | 21.3 | 23.9 | 17.1 | 17.5 | 17.1 | 21.3 | 21.3 |
| $Al_2O_3$ | 21.3 | 21.3 | 21.3 | 24.3 | 24.2 | 18.0 | 24.2 | 21.3 | 21.3 |
| FeO | 2.9 | 4.1 | 4.0 | | | | | | |
| MnO | | | | 2.7 | 2.7 | 2.6 | 2.5 | 2.5 | 3.5 |
| $TiO_2$ | 4.8 | 4.8 | 6.1 | 8.9 | 8.8 | 8.5 | 4.7 | 8.7 | 8.7 |

| | 28 | 29 | 30 | 31 | 32 | 33 | 34 | 35 | 36 |
|---|---|---|---|---|---|---|---|---|---|
| $SiO_2$ | 63.1 | 67.2 | 63.1 | 51.8 | 58.7 | 64.5 | 60.2 | 51.0 | 51.0 |
| $Na_2O$ | 16.6 | 16.3 | 16.6 | 23.9 | 17.1 | 17.5 | 20.9 | 91.0 | 30.0 |
| $Al_2O_3$ | 20.3 | 16.5 | 20.3 | 24.3 | 24.2 | 18.0 | 18.9 | 30.0 | 19.0 |
| NiO | 2.3 | 2.3 | 6.0 | | | | | | |
| ZnO | | | | 4.1 | 4.1 | 4.0 | 4.0 | | |
| $TiO_2$ | 7.8 | 7.2 | 7.8 | 6.2 | 6.2 | 6.0 | 8.6 | 4.8 | 4.7 |
| MgO | | | | | | | | 4.0 | 4.0 |

| | 37 | 38 | 39 | 40 | 41 | 42 | 43 | 44 | 45 |
|---|---|---|---|---|---|---|---|---|---|
| $SiO_2$ | 53.0 | 55.0 | 55.0 | 65.0 | 68.0 | 57.4 | 57.4 | 63.1 | 61.0 |
| $NaO_2$ | 24.0 | 15.0 | 25.0 | 19.0 | 16.0 | 21.3 | 21.3 | 16.6 | 20.2 |
| $Al_2O_3$ | 23.0 | 30.0 | 20.0 | 16.0 | 16.0 | 21.3 | 21.3 | 20.1 | 18.8 |
| MgO | 4.1 | 4.0 | 4.0 | 4.0 | 4.0 | 4.0 | 4.0 | 5.5 | 3.0 |
| $TiO_2$ | 4.8 | 4.8 | 4.7 | 4.8 | 4.7 | 3.9 | 8.7 | 7.8 | 3.0 |

| | 46 | 47 | 48 | 49 | 50 | 51 | 52 | 53 | 54 |
|---|---|---|---|---|---|---|---|---|---|
| $SiO_2$ | 61.0 | 61.0 | 61.0 | 61.0 | 61.1 | 61.1 | 61.1 | 61.1 | 61.1 |
| $Na_2O$ | 20.2 | 20.2 | 20.2 | 20.2 | 20.2 | 20.2 | 20.2 | 20.2 | 20.2 |
| $Al_2O_3$ | 18.8 | 18.8 | 18.8 | 18.8 | 18.8 | 18.8 | 18.8 | 18.8 | 18.8 |
| MgO | 4.0 | 4.0 | 3.3 | 3.4 | 4.7 | 7.0 | 9.0 | 7.5 | 4.5 |
| $TiO_2$ | 4.7 | 6.0 | 10.0 | 12.0 | 4.7 | 4.7 | 4.7 | 3.0 | 5.4 |

| | 55 | 56 | 57 | 58 | 59 | 60 | 61 | 62 | 63 |
|---|---|---|---|---|---|---|---|---|---|
| $SiO_2$ | 61.1 | 61. | 61.1 | 57.2 | 62.1 | 61.9 | 56.7 | 61.5 | 61.5 |
| $Na_2O$ | 20.2 | 20.2 | 20.2 | 18.1 | 17.5 | 15.3 | 8.6 | 8.7 | 7.6 |
| $Al_2O_3$ | 18.8 | 18.8 | 18.8 | 21.2 | 18.0 | 18.0 | 21.0 | 17.8 | 17.8 |
| CaO | | | | 3.5 | 2.4 | 4.8 | 13.7 | 12.0 | 13.2 |
| MgO | 5.5 | 7.0 | 8.0 | 4.0 | 3.9 | 3.9 | 4.0 | 3.9 | 3.9 |
| $TiO_2$ | 6.5 | 8.3 | 9.5 | 8.7 | 8.5 | 8.5 | 8.6 | 8.4 | 8.4 |

| | 64 | 65 | 66 | 67 | 68 | 69 | 70 |
|---|---|---|---|---|---|---|---|
| $SiO_2$ | 57.9 | 59.0 | 58.9 | 58.9 | 58.9 | 57.2 | 56.8 |
| $Na_2O$ | 19.1 | 13.7 | 20.7 | 20.7 | 20.7 | 21.2 | 21.2 |
| $K_2O$ | 1.5 | 5.4 | | | | | |
| $Al_2O_3$ | 21.5 | 21.9 | 20.0 | 18.3 | 16.1 | 21.3 | 21.3 |
| $B_2O_3$ | | | 0.4 | 2.2 | 4.4 | | |
| $P_2O_5$ | | | | | | 0.3 | 0.7 |
| MgO | 4.0 | 4.1 | 4.0 | 4.0 | 4.0 | 4.7 | 4.7 |
| $TiO_2$ | 8.8 | 8.9 | 4.7 | 4.7 | 4.7 | 4.0 | 4.0 |

Table I—Continued

|  | 71 | 72 | 73 | 74 | 75 | 76 |
|---|---|---|---|---|---|---|
| $SiO_2$ | 60.6 | 59.3 | 58.3 | 55.8 | 56.3 | 61.0 |
| $Na_2O$ | 20.1 | 19.7 | 19.3 | 15.8 | 15.9 | 20.2 |
| $K_2O$ |  |  | 2.2 | 1.4 | 1.4 |  |
| CaO |  |  |  | 5.4 | 5.5 |  |
| $Li_2O$ |  |  |  | 2.2 |  |  |
| $ZrO_2$ | 0.6 | 2.7 |  |  |  |  |
| BaO |  |  |  | 0.9 |  |  |
| $Al_2O_3$ | 18.7 | 18.3 | 18.0 | 20.7 | 20.9 | 18.8 |
| MgO | 4.0 | 4.0 | 3.9 | 4.0 | 7.4 | 1.0 |
| $TiO_2$ | 4.7 | 4.8 | 4.7 | 5.0 | 4.9 | 5.0 |
| ZnO |  |  |  |  |  | 1.0 |

Glasses having the composition defined in Table I may be prepared from glass batches composed of conventional glass-making materials in the usual manner. Representative glass batches, numbered to correspond to the glass composition produced therefrom set forth in Table I, are set forth in Table II, in which the glass-making ingredients are set forth in parts by weight.

Table II

|  | 1 | 2 | 3 | 6 | 7 | 26 | 27 | 28 | 29 |
|---|---|---|---|---|---|---|---|---|---|
| Sand | 275 | 225 | 225 | 303 | 273 | 224 | 224 | 265 | 291 |
| $Na_2CO_3$ | 171 | 214 | 128 | 141 | 179 | 146 | 146 | 124 | 124 |
| $Al_2O_3$ | 125 | 150 | 200 | 165 | 172 | 141 | 141 | 145 | 121 |
| $TiO_2$ | 50 | 50 | 50 | 50 | 50 | 45 | 45 | 43 | 41 |
| $NiCO_3$ |  |  |  |  |  |  |  | 19 | 19 |
| CdO | 37 | 37 | 37 |  |  |  |  |  |  |
| $MnCO_3$ |  |  |  |  |  | 19 | 26 |  |  |
| $CaCO_3$ |  |  |  | 22 | 56.9 |  |  |  |  |
| $As_2O_5$ | 4 | 4 | 4 | 3 | 3 | 3 | 3 | 3 | 3 |

|  | 30 | 42 | 43 | 44 | 58 | 61 | 62 | 64 | 65 |
|---|---|---|---|---|---|---|---|---|---|
| Sand | 275 | 249 | 249 | 660 | 273 | 273 | 303 | 249 | 249 |
| $Na_2CO_3$ | 128 | 163 | 163 | 308 | 152 | 73 | 75 | 145 | 102 |
| $Al_2O_3$ | 150 | 157 | 157 | 360 | 172 | 172 | 149 | 157 | 157 |
| $CaCO_3$ |  |  |  |  | 27 | 110 | 98 |  |  |
| $K_2CO_3$ |  |  |  |  |  |  |  | 15 | 52 |
| $TiO_2$ | 45 | 22 | 50 | 108 | 55 | 55 | 55 | 50 | 50 |
| $NiCO_3$ | 52 |  |  |  |  |  |  |  |  |
| MgO |  | 12 | 12 | 39 | 13 | 13 | 13 | 12 | 12 |
| $As_2O_3$ | 4 | 4 | 4 | 8 | 4 | 4 | 4 | 4 | 4 |

The above batches should preferably be melted at 1400° C. or higher for at least 4 hours in crucibles, pots or tanks depending upon the desired size of the melt. Melting is preferably carried out under non-oxidizing and non-reducing conditions. The above batches contain 0.6–0.8%, in addition to the base glass, by weight $As_2O_3$ which functions primarily as a fining agent and has practically no oxidizing effect. The amount remaining in the glass has no material effect upon the fundamental characteristics of the glass and the semicrystalline product and, since the residual amount thereof is practically negligible, it is disregarded in the definition of the glass compositions in Table I and in further computations herein.

The hereinbefore recited range of constituents of the glasses which are suitable for the practice of this invention is critical for the following reasons: If the glass contains too much $SiO_2$ and $Na_2O$ or its substituents and too little $Al_2O_3$, it will not crystallize satisfactorily. On the other hand, if the composition contains an excessive amount of $Al_2O_3$ and a deficiency of $SiO_2$ and $Na_2O$ or its substituents it will tend to devitrify spontaneously and a satisfactory glass will not be obtained upon cooling of the molten batch. The substitution of too much CaO for $Na_2O$ tends to increase the size of the crystals formed by the heat treatment and to weaken the products, and for this reason, it is preferable to include no more than 5 mole percent CaO in the base glass composition when the $Na_2O$ is present in an amount of at least 15 mole percent and, likewise, to limit the $Na_2O$ to between 7 mole percent and 10 mole percent when the CaO is present in an amount in excess of 10 mole percent. Too much $K_2O$ causes objectionable deformation during heat treatment. The amount of nucleating agents must be maintained within the specified ranges for the reasons set forth hereinabove.

In Table III are shown the expansion coefficients per ° C. between 0° C. and 300° C. in whole units (Expn. × $10^7$) and specific gravities (sp. gr.), moduli of rupture (p.s.i.) and color of the semicrystalline products of Table I and the respective heat treatments used in converting the glasses thereto.

Table III

|  | Heat treatment | | | | | | Ceramic | | | |
|---|---|---|---|---|---|---|---|---|---|---|
|  | °C. | Hr. | °C. | Hr. | °C. | Hr. | Expn.×$10^7$ | Sp. Gr. | P.s.i. | Color |
| 1 | 800 | 2 | 900 | 8 | 1,000 | 8 |  |  | 17,410 | White. |
| 2 | 800 | 1 | 950 | 4 | 1,000 | 6 |  |  | 17,650 | Do. |
| 3 | 800 | 2 | 900 | 4 | 1,000 | 6 |  |  | 14,200 | Do. |
| 4 | 790 | 3 | 900 | 3 | 1,060 | 3 |  |  |  | Green. |
| 5 | 790 | 3 | 900 | 3 | 1,060 | 3 |  |  |  | Blue. |
| 6 | 800 | 2 | 1,000 | 8 |  |  | 109 | 2.644 | 13,880 | Do. |
| 7 | 800 | 2 | 1,000 | 8 |  |  |  |  |  | Green. |
| 8 | 700 | 3 | 800 | 3 | 1,020 | 3 |  |  |  | Gray. |
| 9 | 700 | 3 | 800 | 3 | 1,020 | 3 |  |  |  | Do. |
| 10 | 700 | 3 | 800 | 3 | 1,020 | 3 |  |  |  | Do. |
| 11 | 800 | 3 | 900 | 3 | 1,050 | 3 |  |  |  | Grayish. |
| 12 | 800 | 3 | 900 | 3 | 1,100 | 3 | 120 | 2.523 |  | Green. |
| 13 | 800 | 3 | 1,020 | 3 |  |  |  |  |  | Do. |
| 14 | 700 | 3 | 900 | 3 | 1,035 | 3 |  |  |  | Do. |
| 15 | 815 | 3 | 1,030 | 3 |  |  |  |  |  | Brown. |
| 16 | 740 | 3 | 845 | 3 | 1,020 | 3 |  | 2.681 |  | Do. |
| 17 | 815 | 3 | 1,030 | 3 |  |  |  | 2.592 |  | Copper. |
| 18 | 750 | 1 | 1,060 | 8 |  |  |  |  | 10,890 | Olive. |
| 19 | 720 | 2 | 900 | 4 | 1,060 | 4 |  |  | 10,460 | Gray. |
| 20 | 720 | 2 | 900 | 4 | 1,060 | 4 | 118.5 | 2.663 |  | Brown. |
| 21 | 750 | 2 | 850 | 2 | 1,020 | 2 |  |  | 11,410 | Gray. |
| 22 | 800 | 3 | 900 | 3 | 1,015 | 3 |  |  |  | Brown. |
| 23 | 800 | 3 | 900 | 3 | 1,040 | 3 |  | 2.709 |  | Do. |
| 24 | 800 | 3 | 900 | 3 | 1,015 | 3 |  | 2.627 |  | Do. |
| 25 | 740 | 3 | 850 | 3 | 1,020 | 3 |  | 2.669 |  | Do. |
| 26 | 800 | 2 | 900 | 8 | 1,000 | 8 |  |  | 20,060 | Yellow. |
| 27 | 830 | 3 | 1,080 | 12 |  |  |  |  | 14,420 | Do. |
| 28 | 800 | 2 | 920 | 6 | 1,000 | 12 | 111 | 2.625 | 17,480 | Green. |
| 29 | 750 | 1 | 900 | 8 |  |  | 112 | 2.590 | 16,650 | Yellow. |
| 30 | 850 | 4 | 1,000 | 8 |  |  |  |  | 19,500 | Green. |
| 31 | 740 | 3 | 850 | 3 | 1,020 | 3 |  |  |  | White. |
| 32 | 740 | 3 | 850 | 3 | 1,020 | 3 |  |  |  | Do. |
| 33 | 740 | 3 | 850 | 3 | 1,020 | 3 |  | 2.643 |  | Do. |
| 34 | 800 | 3 | 900 | 3 | 1,040 | 3 |  | 2.683 |  | Do. |
| 35 | 800 | 3 | 900 | 3 | 1,000 | 3 |  |  |  | Do. |
| 36 | 800 | 3 | 900 | 3 | 1,000 | 3 |  |  |  | Do. |
| 37 | 800 | 3 | 900 | 3 | 1,015 | 3 |  |  |  | Do. |

Table III—Continued

| | Heat treatment | | | | | | Ceramic | | | |
|---|---|---|---|---|---|---|---|---|---|---|
| | °C. | Hr. | °C. | Hr. | °C. | Hr. | Expn.×$10^7$ | Sp. Gr. | P.s.i. | Color |
| 38 | 800 | 3 | 900 | 3 | 1,000 | 3 | | | | White. |
| 39 | 800 | 3 | 900 | 3 | 1,015 | 3 | | | | Do. |
| 40 | 800 | 3 | 900 | 3 | 1,000 | 3 | | | | Do. |
| 41 | 800 | 3 | 900 | 3 | 1,000 | 3 | | | | Do. |
| 42 | 800 | 2 | 900 | 6 | 1,080 | 12 | | | 16,160 | Do. |
| 43 | 850 | 6 | 1,000 | 8 | | | 120 | 2.608 | 15,100 | Do. |
| 44 | 850 | 6 | 1,000 | 9 | | | | | 13,350 | Do. |
| 45 | 800 | 3 | 900 | 3 | 1,050 | 3 | | | | Do. |
| 46 | 800 | 3 | 900 | 3 | 1,020 | 3 | 118 | | 11,500 | Do. |
| 47 | 800 | 3 | 900 | 3 | 1,000 | 3 | | | 9,700 | Do. |
| 48 | 800 | 3 | 900 | 3 | 1,000 | 3 | | | 13,450 | Do. |
| 49 | 800 | 3 | 900 | 3 | 1,000 | 3 | | | 9,740 | Do. |
| 50 | 850 | 3 | 1,030 | 3 | | | | | | Do. |
| 51 | 805 | 3 | 1,050 | 3 | | | | | | Do. |
| 52 | 850 | 3 | 1,030 | 3 | | | | | | Do. |
| 53 | 800 | 3 | 900 | 3 | 1,030 | 3 | | | | Do. |
| 54 | 800 | 3 | 900 | 3 | 1,000 | 3 | 117 | 2.614 | | Do. |
| 55 | 800 | 3 | 900 | 3 | 1,055 | 3 | | | 12,950 | Do. |
| 56 | 800 | 3 | 900 | 3 | 1,000 | 3 | 116 | 2.643 | | Do. |
| 57 | 800 | 3 | 900 | 3 | 1,055 | 3 | | | 11,430 | Do. |
| 58 | 800 | 1.5 | 900 | 3 | 1,050 | 8 | 107 | 2.656 | 12,980 | Do. |
| 59 | 800 | 1 | 900 | 3 | 1,000 | 6 | | | 9,260 | Do. |
| 60 | 800 | 1 | 900 | 3 | 1,000 | 6 | | | | Do. |
| 61 | 830 | 3 | 1,080 | 12 | | | 67 | 2.758 | 18,750 | Do. |
| 62 | 800 | 1.5 | 900 | 3 | 1,050 | 8 | 66 | 2.718 | | Do. |
| 63 | 800 | 1.5 | 900 | 3 | 1,050 | 8 | | | 18,100 | Do. |
| 64 | 800 | 3 | 1,100 | 12 | | | | | 14,250 | Do. |
| 65 | 830 | 3 | 920 | 3 | 1,080 | 12 | | | 9,920 | Do. |
| 66 | 800 | 3 | 900 | 3 | 1,000 | 3 | | | | Do. |
| 67 | 800 | 3 | 900 | 3 | 1,000 | 3 | | | | Do. |
| 68 | 800 | 3 | 900 | 3 | 1,000 | 3 | | | | Do. |
| 69 | 1,020 | 2 | | | | | | | 13,700 | Do. |
| 70 | 1,020 | 2 | | | | | | | 11,420 | Do. |
| 71 | 750 | 2 | 850 | 2 | 1,060 | 2 | | | 11,450 | Do. |
| 72 | 750 | 2 | 850 | 2 | 1,060 | 2 | | | 12,310 | Do. |
| 73 | 780 | 1 | 1,020 | 2 | | | | | | Do. |
| 74 | 750 | 4 | 900 | 1 | 1,040 | 3 | 112 | 2.697 | 16,540 | Do. |
| 75 | 780 | 1 | 1,020 | 2 | | | 110 | 2.686 | 14,700 | Do. |
| 76 | 800 | 3 | 900 | 3 | 1,015 | 3 | | | | Do. |

The modulus of rupture is measured by supporting individual rods of the semicrystalline product, about ¼" in diameter and 4" long, on 2 knife edges spaced 3½" apart and individually loading them on 2 downwardly acting knife edges about ¾" apart and centrally spaced from the lower knife edges until breakage of the rods occurs. To make the results more comparable, the rods are first abraded by being rolled in a ball mill for 15 minutes with 30-grit silicon carbide. Abraded annealed rods of glass in general, when measured in this manner, show moduli of rupture ranging from 6,000 to 8,000 p.s.i.

By way of comparison of the semicrystalline products with the glasses before heat-treatment, the expansion coefficients per ° C. between 0° C. and 300° C. in whole units and specific gravities of representative glasses are given in Table IV.

Table IV

| No. | Expn.×$10^7$ | Sp. Gr. |
|---|---|---|
| 6 | 80.2 | 2.527 |
| 43 | 95 | 2.545 |
| 58 | 84 | 2.574 |
| 61 | 62 | 2.656 |

On account of the large amount of time involved in the determination of the physical properties of the glasses and the semicrystalline products, some of the properties were not measured; but where the physical properties have been measured, those properties are given. Even in those cases where the properties are not given, however, the examples represent actual compositions which were compounded, melted to glasses, and treated in accordance with the teachings herein set forth; and the resulting products had the characteristics of the desired ceramics.

The semicrystalline products of this invention differ from prior semicrystalline products in that the crystalline phases of the present products are either nepheline or plagioclase. They may be produced, if desired, with a variety of colors. Those in which the nucleating agent is a titanate of MgO, ZnO, or CdO are white; and those in which the nucleating agent is a titanate of MnO, CoO, NiO, or FeO, or $Cr_2O_3$ may be formed with colors ranging from gray to yellow through green, blue, and brown depending upon the coloring metal and its amount.

Moreover the expansion coefficients of the present products can be varied over a wide range from about $60 \times 10^{-7}$ to $120 \times 10^{-7}$ per ° C. by substitution of CaO for $Na_2O$ as described above, the expansion coefficient being progressively decreased by increasing substitutions of CaO within the prescribed limits. While compositions containing $Cr_2O_3$ therein as the nucleating agent when processed according to the present invention produce desirable semicrystalline bodies, the glasses which are nucleated by divalent metal titanates have superior glass-working properties and hence are preferable thereto. Of the preferred titanate nucleating agents, $MgO \cdot TiO_2$ is especially suitable because it produces colorless glasses which can be more readily inspected for glass defects prior to heat treating and is available in inexpensive batch ingredients.

While glasses containing $SiO_2$, $Al_2O_3$, $Na_2O$, CaO, and $K_2O$, within the above-described ranges and up to 10 mile percent of other minor ingredients are all amenable to the process of the present invention, those which consist almost entirely of only $Na_2O$, $Al_2O_3$, and $SiO_2$ are particularly suitable for drawing into sheet glass from the melt because of their viscosity at the working temperature. Example No. 46 in Table I sets forth a particularly suitable composition of this type which results in a glass which can be converted to the desired semicrystalline body with a minimum amount of distortion upon heat treatment. Examples Nos. 69 and 70 exemplify compositions which possess very favorable viscosity-liquidus relationship for the drawing of sheet glass.

While the inclusion of substantial amounts of CaO in the above-defined compositions produce satisfactory low-expansion bodies, the melts thereof are quite fluid at the liquidus temperature and hence are most readily formable by casting techniques. The composition of Example 63 is a preferred embodiment of a glass composition which is amenable to the present process to produce a semicrystalline body containing plagioclase and having relatively high strength.

In order to make the description of the method of making the product of this invention more clear, the following drawings are submitted wherein:

FIGURE 1 represents a phase diagram setting forth the crystalline phases present in the semicrystalline ceramic article resulting from the process of the invention utilizing an arbitrary three-component system $XO \cdot Al_2O_3 \cdot SiO_2$, wherein XO represents the total amount of $$Na_2O + CaO + K_2O$$

The amount of nucleating agent is considered as being in excess over the base composition.

Figure 2:
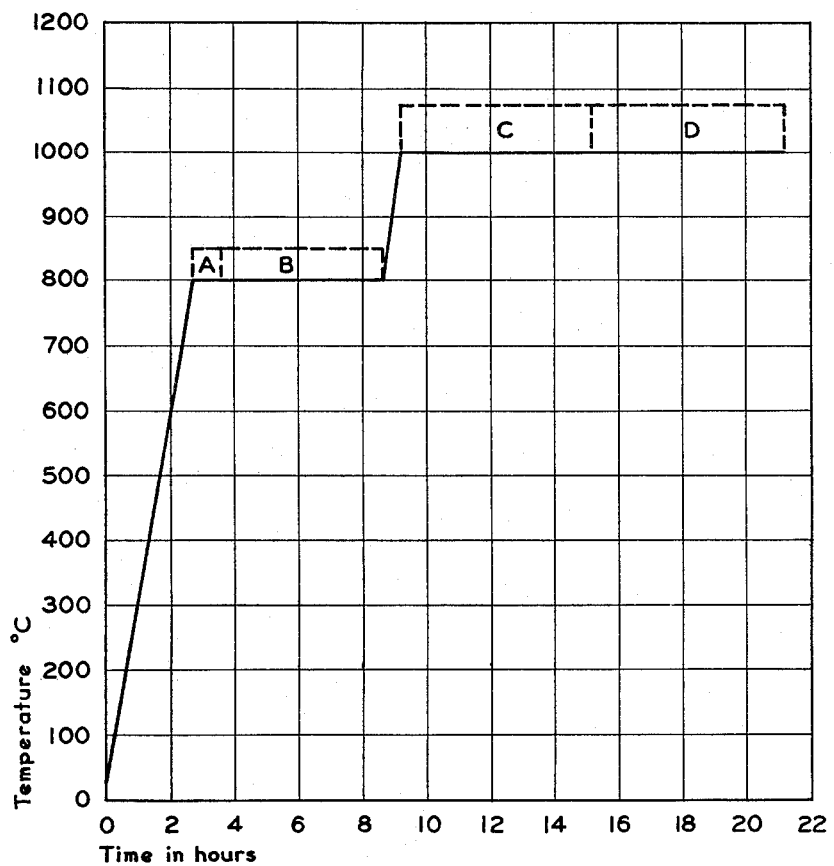

FIGURE 2 consists of a time-temperature chart recording the preferred two-step heat treating schedule of the invention set forth above. Thus, after melting the batch at about 1400° C., simultaneously cooling and forming the melt into a glass article of a desired shape, and then cooling to room temperature, the glass article is subjected to the following heat treatment:

(1) The article is heated at 5° C./minute to 800°–850° C.;

(2) The article is held thereat for 1–4 hours (A and B representing 1 and 4 hours, respectively); and then (3) The article is heated at 5° C./minute to 1000°–1080° C. for 6–12 hours (C and D representing 6 and 12 hours, respectively).

This application is a continuation-in-part of my application Serial No. 783,703, filed December 30, 1958, now abandoned.

What is claimed is:

1. The method of making a semicrystalline ceramic body by the heat treatment of glass bodies consisting of a base glass consisting essentially on a mole percent basis of 50–68% $SiO_2$, 16–34% $Al_2O_3$, 7–34% $Na_2O$, 0–15% CaO, 0–6% $K_2O$, the total $Na_2O$, CaO, and $K_2O$ being at least 15% but not over 34%, the mole ratio of $Na_2O + CaO + K_2O : Al_2O_3$ not exceediding 1.7, which comprises including in the glass batch constituents of a compound forming crystals with ilmenite-type structures as nucleating agent in the indicated proportions, based upon a mole percent in excess over the said base glass composition, selected from the group consisting of $Cr_2O_3$ in an amount of 0.08–0.5% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide consituent of the ilmenite-type structure and 2.9–12% of the $TiO_2$ constituent thereof, and thereafter heat treating the glass body, formed to the desired shape from the molten glass, by exposing the glass body to a temperature between 800° C. and 1150° C. for a sufficient time to cause a major proportion of the glass to crystallize.

2. The method of making a semi-crystalline ceramic body comprising nepheline crystals dispersed in a glassy matrix by the heat-treatment of a glass body consisting of a base glass consisting essentially on a mole percent basis of 50–68% $SiO_2$, 16–34% $Al_2O_3$, 15–34% $Na_2O$, 0–5% CaO, 0–6% $K_2O$, the total $Na_2O$, CaO, and $K_2O$, being not over 34%, the mole ratio of $$Na_2O + CaO + K_2O : Al_2O_3$$

not exceeding 1.7, which comprises including in the glass batch constituents of compounds forming crystals with ilmenite-type structures as nucleating agent, in the indicated proportion, based upon a mole percent excess over the said base glass composition, selected from the group consisting of $Cr_2O_3$ in an amount of 0.08–0.50% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof, and thereafter heat-treating the glass body, formed to the desired shape from the molten glass, by exposing the glass body to a temperature between 800° C. and 1150° C. for a sufficient time to cause a major proportion of the glass to crystallize.

3. The method of making a semi-crystalline ceramic body comprising plagioclase crystals dispersed in a glassy matrix by the heat-treatment of a glass consisting of a base glass consisting essentially on a mole percent basis of 50–68% $SiO_2$, 16–34% $Al_2O_3$, 7–10% $Na_2O$, 10–15% CaO, 0–6% $K_2O$, the total $Na_2O$, CaO, and $K_2O$, being not over 24%, the mole ratio of $$Na_2O + CaO + K_2O : Al_2O_3$$

not exceeding 1.7, which comprises including in the glass batch constituents of a compound forming crystals with ilmenite-type structures as nucleating agent, in the indicated proportion, based upon a mole percent excess over the said base glass composition, selected from the group consisting of $Cr_2O_3$ in an amount of 0.08–0.50% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof, and thereafter heat-treating the glass body, formed to the desired shape from the molten glass, by exposing the glass body to a temperature between 800° C. and 1150° C. for a sufficient time to cause a major proportion of the glass to crystallize.

4. The method of claim 1 in which the heat-treatment comprises raising the temperature of the glass body to a temperature of about 800° C.–850° C. and maintaining the temperature within said range for a period of about 1–4 hours and subsequently heating the glass body to a temperature of about 1000° C.–1080° C. and maintaining the glass body in said second temperature range for about 6–12 hours.

5. The method of making a semi-crystalline ceramic body by the heat-treatment of a glass body consisting of a base glass consisting essentially on a mole percent basis of 50–68% $SiO_2$, 16–34% $Al_2O_3$, 15–34% $Na_2O$, 0–6% $K_2O$, the total $Na_2O$, and $K_2O$, being not over 34%, the mole ratio of $Na_2O + K_2O : Al_2O_3$ not exceeding 1.7, which comprises including in the glass batch constituents of a compound forming crystals with ilmenite-type structures as nucleating agent, in the indicated proportion, based upon a mole percent excess over the said base glass compositions, selected from the group consisting of $Cr_2O_3$ in an amount of 0.08–0.50% of the base glass composition and 6–22% of the base glass composition of the constituents of at least one of the ilmenite-type structure consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof, and thereafter heat-treating the glass body, formed to the desired shape from the molten glass, by exposing the glass body to a temperature between 800° C. and 1150° C. for a sufficient time to cause a major proportion of the glass to crystallize.

6. The method of claim 1 in which the heat-treatment comprises exposing the glass body to a temperature of 800° C. to 850° C. for about 1–4 hours, subsequently exposing it to a temperature of 900° C. to 950° C. for about 3–8 hours, and finally exposing the glass body to a temperature of about 1000° C. to 1080° C. for about 6–12 hours.

7. A glass crystallizable through heat treatment consisting of a base glass consisting essentially on a mole percent basis of 50–68% $SiO_2$, 16–34% $Al_2O_3$, 7–34% $Na_2O$, 0–15% CaO, 0–6% $K_2O$, the total $Na_2O$, CaO, and $K_2O$ being at least 15% but not over 34%, the mole ratio of $Na_2O+CaO+K_2O:Al_2O_3$ not exceeding 1.7, and including constituents of a compound forming crystals with ilmenite type structures as nucleating agent in the indicated proportions, based upon a mole percent in excess over the said base glass composition, selected from the group consisting of $Cr_2O_3$ in an amount of 0.08–0.50% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof.

8. A glass crystallizable through heat treatment consisting of a base glass consisting on a mole percent basis of 50–68% $SiO_2$, 16–34% $Al_2O_3$, 15–34% $Na_2O$, 0–5% CaO, 0–6% $K_2O$, the total $Na_2O$, CaO, and $K_2O$ being not over 34%, the mole ratio of $$Na_2O+CaO+K_2O:Al_2O_3$$

not exceeding 1.7, and including constituents of a compound forming crystals with ilmenite-type structures as nucleating agent in the indicated proportions, based upon a mole percent in excess over the said base glass composition, selected from the group consisting of $Cr_2O_3$ in an amount of 0.08–0.50% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof.

9. A glass crystallizable through heat treatment consisting of a base glass consisting on a mole percent basis of 50–68% $SiO_2$, 16–34% $Al_2O_3$, 7–10% $Na_2O$, 10–15% CaO, 0–6% $K_2O$, the total $Na_2O$, CaO, and $K_2O$ being not over 34%, the mole ratio of $$Na_2O+CaO+K_2O:Al_2O_3$$

not exceeding 1.7, and including constituents of a compound forming crystals with ilmenite-type structures as nucleating agent in the indicated proportions, based upon a mole percent in excess over the said base composition, selected from the group consisting of $Cr_2O_3$ in an amount of 0.08–0.50% of the base glass composition and 6–22% of the base glass composition of the constituents of at least one of the ilmenite-type structures consisting of $FeO \cdot TiO_2$, $CoO \cdot TiO_2$, $CdO \cdot TiO_2$, $ZnO \cdot TiO_2$, $NiO \cdot TiO_2$, $MnO \cdot TiO_2$, and $MgO \cdot TiO_2$, the total sum percentage of the ilmenite-type structures recited above, 6–22%, consisting of 1.9–10% of the divalent metal oxide constituent of the ilmenite-type structure and 2.9–12% of the $TiO_2$ constituent thereof.

References Cited in the file of this patent

UNITED STATES PATENTS

| | | |
|---|---|---|
| 1,814,012 | Taft | July 14, 1931 |
| 2,113,818 | Sullivan | Apr. 12, 1938 |
| 2,663,658 | Schurecht | Dec 22, 1953 |
| 2,683,666 | Duncan et al. | July 13, 1954 |
| 2,691,855 | Armistead | Oct. 19, 1954 |
| 2,779,136 | Hood et al. | Jan. 29, 1957 |
| 2,876,120 | Machlan | Mar. 3, 1959 |
| 2,920,971 | Stookey | Jan. 12, 1960 |
| 3,063,198 | Babcock | Nov. 13, 1962 |

OTHER REFERENCES

The Structure of Glass (translated from Russian), published by Consultants Bureau, New York, 1938; article by Kobeko, entitled "Glass as a Homogeneous System Capable of Reaching a State of Equilibrium," pages 233 to 236; also the article entitled, "The Liquid and Glass States," by G. M. Bartner, found on pages 231 and 232. A copy of these articles may be found in Division 170–86 of the U.S. Patent Office.

The Structure of Glass (translated from Russian, volume 2), published by Consultants Bureau, New York, 1960, article by Botvinkin entitled, "The Vitrification Process and Structure of Glass," pages 99 to 101; a copy of this article may be found in Division 170–86 of the U.S. Patent Office.

Phase Diagrams for Ceramists, by Levin, McMurdie and Hall, published by the American Ceramic Society, Columbus, Ohio, 1956. Copy in Division 91, Patent Office, pages 14–25, 206.

Handbook of Glass Manufacture, vol. II, by Tooley, published by Ogden Publishing Co., 55 West 42nd St., New York 36, N.Y., 1960. Pages 187–199. Available in Div. 91, Patent Office.

The Glass Industry, May 1958, page 275.

UNITED STATES PATENT OFFICE
CERTIFICATE OF CORRECTION

Patent No. 3,146,114　　　　　　　　　　　　　　　　August 25, 1964

Herbert D. Kivlighn

It is hereby certified that error appears in the above numbered patent requiring correction and that the said Letters Patent should read as corrected below.

In the drawings, Sheet 1, FIG. 1, in the first line of the group of nucleating agents set out at the upper right of the ternary diagram, for "$C_2O_3$" read -- $Cr_2O_3$ --; in the third line of this same groups, for "$N1TiO_3$" read -- $NiTiO_3$ --; in the second line of the explanation of XO set out at the lower left of the ternary diagram, for "$H_2O$" read -- $K_2O$ --; column 4, Table I, under the heading "10" and opposite "$SiO_2$" for "65.5" read -- 64.5 --; same table, under the heading "16" and opposite "$Al_2O_3$", for "25.2" read -- 24.2 --; same table, under the heading "13" and opposite "$Cr_2O_3$", for "0.13" read -- 0.23 --; same table, under the heading "26" and opposite "MnO", for "2.5" read -- 2.6 --; same table, under the heading "35" and opposite "$Na_2O$", for "91.0" read -- 19.0 --; same table, in that portion of the table setting out Examples 37 to 45, for "$NaO_2$" read -- $Na_2O$ --; column 5, Table II, first column, line 8 thereof, for "$CaCO_3$" read -- $CoCO_3$ --; column 8, line 53, for "mile" read -- mole --; column 9, line 36, for "exceedidng" read -- exceeding --.

Signed and sealed this 9th day of March 1965.

(SEAL)
Attest:

ERNEST W. SWIDER　　　　　　　　　　　　　　　　EDWARD J. BRENNER
Attesting Officer　　　　　　　　　　　　　　　　Commissioner of Patents